US012445085B2

(12) United States Patent
Palacios et al.

(10) Patent No.: US 12,445,085 B2
(45) Date of Patent: Oct. 14, 2025

(54) SOLAR AUTONOMOUS ROOF ASSEMBLY

(71) Applicant: SOM IW HOLDINGS, LLC, New York, NY (US)

(72) Inventors: Jose Palacios, Los Angeles, CA (US); James Diewald, Los Angeles, CA (US); Taylor Montgomery, Los Angeles, CA (US); Michael Johnson, Los Angeles, CA (US); Frank Castillo, Los Angeles, CA (US); Benton Johnson, Chicago, IL (US)

(73) Assignee: SOM IW HOLDINGS, LLC, New York, NY (US)

( * ) Notice: Subject to any disclaimer, the term of this patent is extended or adjusted under 35 U.S.C. 154(b) by 329 days.

(21) Appl. No.: 18/157,399

(22) Filed: Jan. 20, 2023

(65) Prior Publication Data

US 2024/0250634 A1    Jul. 25, 2024

(51) Int. Cl.

| | |
|---|---|
| *H02S 20/23* | (2014.01) |
| *E04D 3/35* | (2006.01) |
| *E04D 3/36* | (2006.01) |
| *E04D 3/362* | (2006.01) |
| *E04D 3/366* | (2006.01) |
| *E04D 3/40* | (2006.01) |
| *E04D 13/064* | (2006.01) |
| *F24S 80/40* | (2018.01) |
| *F24S 80/60* | (2018.01) |

(Continued)

(52) U.S. Cl.
CPC .............. *H02S 20/23* (2014.12); *E04D 3/352* (2013.01); *E04D 3/357* (2013.01); *E04D 3/3605* (2013.01); *E04D 3/362* (2013.01); *E04D 3/40* (2013.01); *E04D 13/064* (2013.01); *F24S 80/40* (2018.05); *F24S 80/70* (2018.05); *H02S 40/44* (2014.12); *E04D 3/366* (2013.01); *F24S 80/60* (2018.05)

(58) Field of Classification Search
CPC ......... H02S 20/23; E04D 3/352; E04D 3/357; E04D 3/3605; E04D 3/362; E04D 3/40; E04D 13/064; E04D 3/366
See application file for complete search history.

(56) References Cited

U.S. PATENT DOCUMENTS

| | | |
|---|---|---|
| 5,573,600 A | 11/1996 | Hoang |
| 8,476,522 B2 | 7/2013 | Schultz et al. |

(Continued)

FOREIGN PATENT DOCUMENTS

| | | |
|---|---|---|
| CH | 708256 A2 | 12/2014 |
| DE | 10041271 A1 | 3/2002 |

(Continued)

*Primary Examiner* — Rodney Mintz
(74) *Attorney, Agent, or Firm* — David Metzger; DENTONS US LLP

(57) ABSTRACT

A modular composite panel comprised of a solar photovoltaic panel, a solar thermal collector panel, and an engineered torsion box containing a layer of insulation. Multiple composite panels can form a roof when installed in an array, with panels abutting and situated side-by-side on a structural frame or other suitable support system. A composite panel may span between structural members without requiring intermediate support. A composite panel array can provide weather protection, electricity, and hot water to an enclosed or unenclosed space below. Together with insulated walls, the array of composite panels can provide thermal insulation to an enclosed space below.

27 Claims, 14 Drawing Sheets

(51) Int. Cl.
*F24S 80/70* (2018.01)
*H02S 40/44* (2014.01)

(56) References Cited

U.S. PATENT DOCUMENTS

| | | | | |
|---|---|---|---|---|
| 9,281,430 | B2* | 3/2016 | Carolan | H02S 20/23 |
| 9,863,149 | B2* | 1/2018 | Wu | H02S 20/26 |
| 10,287,775 | B2* | 5/2019 | Wu | H02S 20/25 |
| 10,381,500 | B2 | 8/2019 | Rubio et al. | |
| 11,283,394 | B2* | 3/2022 | Perkins | H02S 20/25 |
| 2005/0133082 | A1 | 6/2005 | Konold et al. | |
| 2009/0255573 | A1* | 10/2009 | Taylor | H02S 20/23 |
| | | | | 136/251 |
| 2009/0266400 | A1* | 10/2009 | DeLiddo | H02S 20/23 |
| | | | | 248/205.2 |
| 2010/0218809 | A1* | 9/2010 | Schultz | F24S 80/30 |
| | | | | 136/248 |
| 2011/0155222 | A1* | 6/2011 | Ehbing | H10F 19/80 |
| | | | | 156/60 |
| 2012/0167492 | A1 | 7/2012 | Cummings | |
| 2012/0192920 | A1 | 8/2012 | McCowan et al. | |
| 2014/0150357 | A1* | 6/2014 | Carolan | H02S 20/23 |
| | | | | 52/173.3 |
| 2015/0155822 | A1* | 6/2015 | Feng | H02S 20/26 |
| | | | | 136/259 |
| 2015/0349178 | A1* | 12/2015 | Rubio | H10F 77/67 |
| | | | | 136/248 |
| 2017/0292271 | A1 | 10/2017 | Wu et al. | |
| 2018/0094438 | A1* | 4/2018 | Wu | E04D 3/30 |
| 2018/0097134 | A1* | 4/2018 | Hsieh | G10K 11/168 |
| 2021/0257961 | A1* | 8/2021 | Perkins | B32B 25/08 |
| 2023/0421092 | A1* | 12/2023 | Cordeiro De Oliveira | H02S 20/23 |

FOREIGN PATENT DOCUMENTS

| | | |
|---|---|---|
| DE | 10203338 A1 | 7/2003 |
| DE | 202019005055 U1 | 3/2020 |
| EP | 3367018 A1 | 8/2018 |
| WO | 2017/108984 A1 | 6/2017 |
| WO | 2019/104380 A1 | 6/2019 |
| WO | 2020/193824 A1 | 1/2020 |

* cited by examiner

SOLAR AUTONOMOUS ROOF ASSEMBLY

BACKGROUND

The present disclosure relates to roof structures composed of modular composite panels with integrated solar photovoltaics and solar thermal components.

Conventional roof systems include sheathing, insulation, a moisture barrier, and interior and exterior finishes mounted to a structural frame. In non-prefabricated modular housing construction, each of these are delivered separately and individually cut and assembled on site. The materials required are relatively low cost, but these construction techniques require significant skilled labor from multiple trades. Additionally, this process generates significant waste from off-cuts, packaging, and construction errors.

Modular composite panels offer an alternate construction approach that reduces material waste, build times, and risks associated with coordination between multiple trades. Modular composite panels are typically factory-built with automated processes under controlled conditions, which allow for systematic quality control. Design, supply chain, and fabrication processes can be optimized to promote material and labor efficiency while controlling cost. On-site, modular composite panels allow for rapid assembly without extensive specialized knowledge. Hardware, weather-seals, and connections for hydronic and electrical systems can be integrated into the panels to provide 'plug-and-play' assembly with few or no tools. Potential drawbacks to modular construction include limitations in assembly variation and up-front costs that require economies of scale to yield cost savings.

Solar photovoltaic panels and solar thermal collector panels are used to provide on-site renewable energy in the form of electricity and heat. This energy can be utilized to provide heating and cooling and to power electrical systems, equipment, and appliances. This approach reduces operational carbon and energy cost burdens. Furthermore, distributed energy infrastructures can reduce the inefficiencies and risks of electrical transmission while promoting community resilience in the face of grid failures or natural disasters. Solar panels are typically installed in a metal frame over a conventional roof system as described above. The installation process involves multiple penetrations of the roof assembly by fasteners that can compromise the moisture barrier. This creates risks for home-owners and ambiguities with warranties and responsible parties where the roof and solar panels are installed under separate contracts. Because most solar panels are modular and are not well-integrated into the roof, they are also often considered aesthetically unpleasant. Similar challenges exist for solar thermal collectors, which are generally separate systems from the solar photovoltaic panels.

SUMMARY OF THE INVENTION

Disclosed herein are one or more inventions relating to a prefabricated modular composite panel, structural systems employing the composite panel in an array, methods of fabricating the composite panel, and methods of installing the composite panel. A roof assembly employing the modular composite panel is also referred to herein as a solar autonomous roof assembly ("SARA"). Such a composite panel combining the performative requirements of the roof, the solar panel and the solar thermal panel can provide an aesthetically and procedurally integrated alternative to conventional, independent systems.

SARA panels, when joined in an array, can provide structure, insulation, weather protection, solar electricity, and solar hot water as a modular roof system. In a roof assembly, separate electrical and hydronic loops with proprietary connections are housed in weather-protected raceways that link each composite panel to the electrical and plumbing systems of a building. Dovetailed structural connections between composite panels enhance structural spans and allow the composite panel array to function as a single structural diaphragm. Lap joints and gaskets provide weather seals between composite panels to protect against air and moisture infiltration across the array. Adaptable perimeter-edge panels shade facades, link raceways, and integrate gutters for rainwater collection.

As used herein:

"Timber" includes natural and manmade wood unless stated otherwise. "Timber" and "lumber" are used interchangeably herein.

"Timber panel" means a sheet of timber whether single or multi-ply.

"Prefabricated" means built in advance and transportable to an installation site for assembly.

In a preferred embodiment of the composite panel, a top layer includes of a solar photovoltaic panel (photovoltaic cells laminated to a glass sheet) with a thermally conductive solar thermal collector panel immediately underneath the solar photovoltaic panel. A bottom layer below the top layer includes of an engineered torsion box containing, preferably filled with, a layer of insulation. The top and bottom layers of the composite panel are connected by extruded framing components fastened along the perimeter of the engineered torsion box and the solar thermal collector panel. The solar photovoltaic panel is glazed into the framing components with silicone and setting blocks.

In some embodiments, the top layer of the composite panel may include of one or more panels of other types or materials which may perform other functions, such as a transparent glass sheet with or without photovoltaic cells which may act as a skylight, or opaque or transparent panels without photovoltaic cells in areas shaded or facing away from the sun, or to accommodate building mechanical, ventilation, or other services as necessary.

In a preferred embodiment, the solar photovoltaic panel and the solar thermal collector panel, or other panels, the extruded framing components, and the engineered torsion box are of the same or similar length and are rigidly connected to each other through combinations of, but not limited to, mechanical fasteners, clips, or adhesives.

In a preferred embodiment, the composite panel is proportionally elongated to provide adequate structural span while accommodating maneuverability around a building site.

In a preferred embodiment, the extruded framing components are profiled in such a way that allows for the top layer (the solar photovoltaic panel and solar thermal collector panel, or other panels) to be removed from the engineered torsion box for maintenance or replacement. The extruded framing components are also profiled in a way to receive various weather-seal components that provide weather protection for adjacent composite panels in a roof array.

In a preferred embodiment, the composite panel does not rely on the insulation layer to provide composite structural performance, i.e., the insulation layer does not impart structural rigidity.

In a preferred embodiment, mating joinery profiles provided along opposite sides of the engineered torsion box are used to form a rigid connection between composite panels, reducing the use of mechanical fasteners and time of assembly into an array on a building site, and allowing the array of composite panels to function as a single structural diaphragm.

In a preferred embodiment, the short ends of elongated composite panels are installed on top of structural members. The edges of the solar photovoltaic panel, the solar thermal collector panel, and the insulation are offset from the short ends of the composite panel to create a weather sealed cavity for hydronic and electrical conduits to travel. In some embodiments, this weather sealed cavity or "raceway" runs downslope perpendicular to the structural span of the composite panels. In some embodiments, an array of composite panels contains a variation of a composite panel that may serve as a vertical riser for conduit, vents, and other connections to building systems for other composite panels in the array.

In a preferred embodiment, perimeter composite panels of similar construction and dimension to the primary composite panel, but without solar photovoltaic or thermal collector panels, are arranged on each of the four sides of the perimeter formed by the array of composite panels, to complete the roof and to integrate with building enclosure elements below the roof.

In some embodiments, the perimeter composite panels extend past the exterior walls of a building to function as an eave and provide shade and additional weather protection to a building.

In some embodiments, the perimeter composite panels contain a weather-sealed cavity for hydronic and electrical conduits to travel.

In some embodiments, the perimeter composite panels contain a method of water catchment or gutter to direct rainwater flow from the top layer of the composite panel array to a downspout.

In an embodiment a composite panel comprises:
a top layer comprising a solar photovoltaic panel and a solar thermal collector panel; and
a bottom layer comprising an engineered torsion box containing a layer of insulation,
wherein, the top layer and the bottom layer are aligned parallel to each other and secured to each other by means of extruded perimeter framing components and sealed by integral gaskets.

In an embodiment, the solar thermal collector panel is between the solar photovoltaic panel and the engineered torsion box.

In an embodiment, the composite panel comprises a top surface with a non-combustible exterior finish.

In an embodiment, the solar thermal collector panel is aligned parallel and underneath the solar photovoltaic panel with a surface of the solar thermal collector panel in contact with a surface of the solar voltaic panel.

In an embodiment, he engineered torsion box supports the solar thermal collector panel and the solar photovoltaic panel.

In an embodiment, extruded framing components secure together the solar photovoltaic panel, the solar thermal collector panel, and the engineered torsion box.

In an embodiment, the bottom surface of the engineered torsion box functions as interior finish and a structural diaphragm.

In an embodiment, top edges of the engineered torsion box are profiled to support the top layer solar photovoltaic panel and solar thermal collector panel when the composite panel is in a sloping position relative to horizontal.

In an embodiment, the engineered torsion box cavity is filled by one or more of the layer of insulation.

In an embodiment, the layer of insulation does not impart structural rigidity.

In an embodiment, solar thermal collector panel is rigid.

The composite panel of claim 1, wherein opposite sides of the engineered torsion box include joinery profiles which mate with a joinery profile of an adjacent composite panel.

In an embodiment, extruded framing components include integral gaskets for weather sealing the engineered torsion box.

The composite panel of claim 1, wherein extruded framing components include integral gaskets for weather sealing between adjacent composite panels.

In an embodiment, a structure comprises:
a load bearing structure with at least two support members; and
composite panels arrayed along the at least two support members, each composited panel according to claim 1 and each supported on the at least two support members.

In an embodiment, the load bearing structure includes a frame or parallel walls constructed of timber, engineered timber, steel, masonry, concrete, or any combination of them.

In an embodiment, at least one of the composite panels o spans between the at least two support members r without an intermediate support member.

In an embodiment, each of opposing sides of two adjacent composite panels a mating joinery profile to provide structural stiffness to the load bearing structure when the joinery profiles are mated.

In an embodiment, the composite panels do not rely on shear wall support.

In an embodiment, each composite panel includes integral weather seals within an extruded frame to provide a seal with an adjacent composite panel.

In an embodiment, the mating joinery profiles are made of timber.

In an embodiment, a roof system comprises:
a load bearing structure including first and second support members arrayed along a first direction;
a plurality of composite panels arrayed along the first and second support members and along a second direct orthogonal to the first direction, each composite panel according to claim 1 and supported on the first and second support members; and
hydronic conduits and electrical conduits integrated into the array of composite panels.

In an embodiment:
the load bearing structure comprises a third support member, the first, second, and third support members being arrayed along the first direction;
a second plurality of composite panels, each according to claim 1 and arrayed in the second direction;
the second plurality of composite panels is supported on the second and third support members and providing a raceway between the first and second pluralities of composite panels; and
hydronic conduits and electrical conduits extend within the raceway.

In an embodiment, the roof system comprises a rise panel attached to one of the composite panels, wherein the hydronic conduits and electrical conduits access building hydronic services and electrical services via the riser panel.

In an embodiment, the roof system comprises a riser panel attached to one of the composite panels, wherein the riser panel has mechanical equipment and plumbing vents.

In an embodiment, the roof is sloped and a downslope end of the array composite panels includes a downslope composite panel which includes an integral gutter.

In an embodiment, the roof is sloped and an upslope end of the array of composite panels includes an upslope composite panel with integral weather sealing gaskets.

Other systems, methods, features, and advantages of the one or more disclosed inventions will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the system disclosed herein, together with the description, explain the advantages and principles of the disclosed system. In the drawings.

DETAILED DESCRIPTION OF THE PREFERRED EMBODIMENT

Reference will now be made in detail to one or more implementations or embodiments using one or more prefabricated modular composite panels consistent with the principles disclosed herein with reference to the accompanying drawings.

Figure 1:
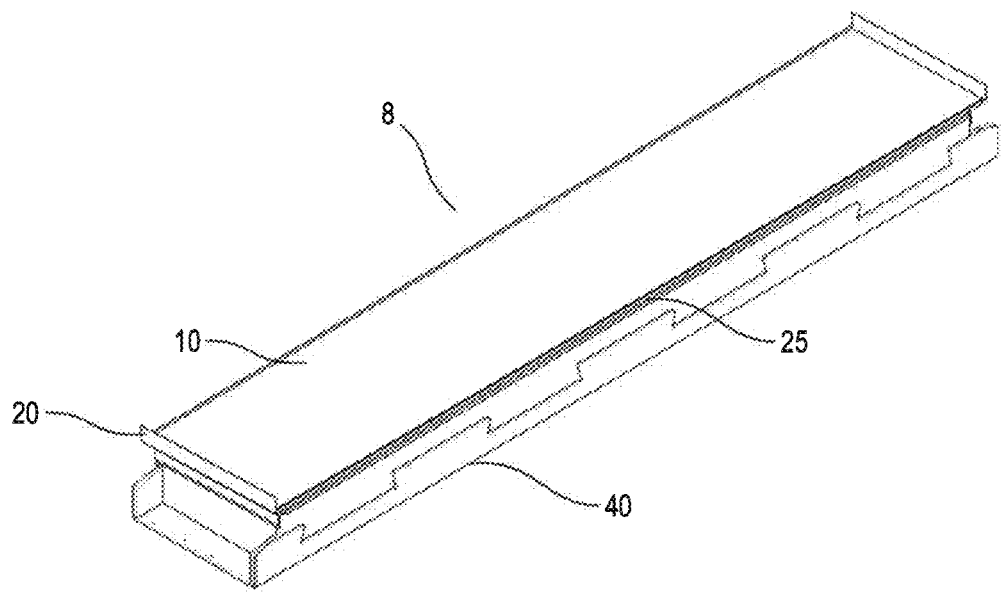
FIG. 1 is an isometric view of a composite panel embodying principles presented herein.

FIG. 1 is isometric view of a composite panel 8 according to principles presented herein. The composite panel 8 is preferably rectangular in plan view and elongated, having two short ends or sides at opposite ends of a long axis which are less in width along a short axis than the length of two longer sides which are parallel to the long axis. As seen in FIG. 1 the composite panel includes a top layer 10 comprised of a solar photovoltaic panel 11 over a solar thermal collector panel 12. The top layer 10 is attached to a bottom layer comprised of an insulated engineered torsion box 40 by means of a top panel extruded frame 20 (comprised of top panel extruded frame members 21 and 22 as described below). In this exemplary description, the elements shown are prefabricated and assembled before being transported to a building site. Each of panels 11 and 12 and the engineered torsion box 40 generally conform to the shape of the composite panel 8, and thus also preferably have two short ends which are shorter along the short axis than the lengths of two long sides along the long axis. If required, the composite panel could also be square in plan view.

Figure 2:
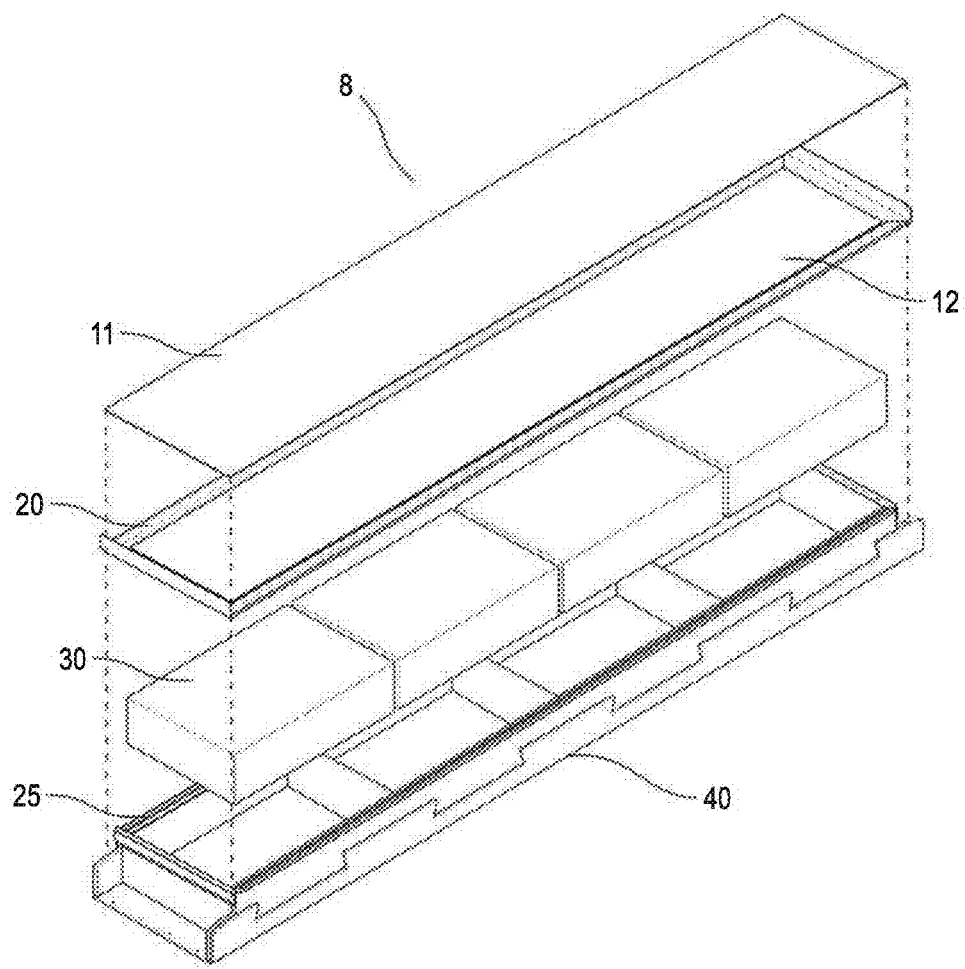
FIG. 2 is an exploded view of the composite panel of FIG. 1 illustrating four primary components: a solar photovoltaic panel, a solar thermal collector panel, layer of insulation, and an engineered torsion box.

FIG. 2 is an exploded view of the composite panel illustrating the four primary components: the solar photovoltaic panel 11, the solar thermal collector panel 12, insulation or layer of insulation 30 (preferably in the form of plural units and preferably comprised of wood fiber), and the engineered torsion box 40 as the preferred embodiment presented herein. As seen in FIG. 2 the solar photovoltaic panel 11 is the topmost layer of the preferred embodiment. The solar thermal collector panel 12 is directly below and in contact with the solar photovoltaic panel to absorb solar thermal energy from the topmost panel through conduction. The engineered torsion box 40 is below the solar photovoltaic panel 11 and filled with insulation 30. The insulated engineered torsion box and solar panels are secured together via cooperation between a top panel extruded frame 20 and a torsion box extruded frame 25 described in greater detail below.

Figure 3:
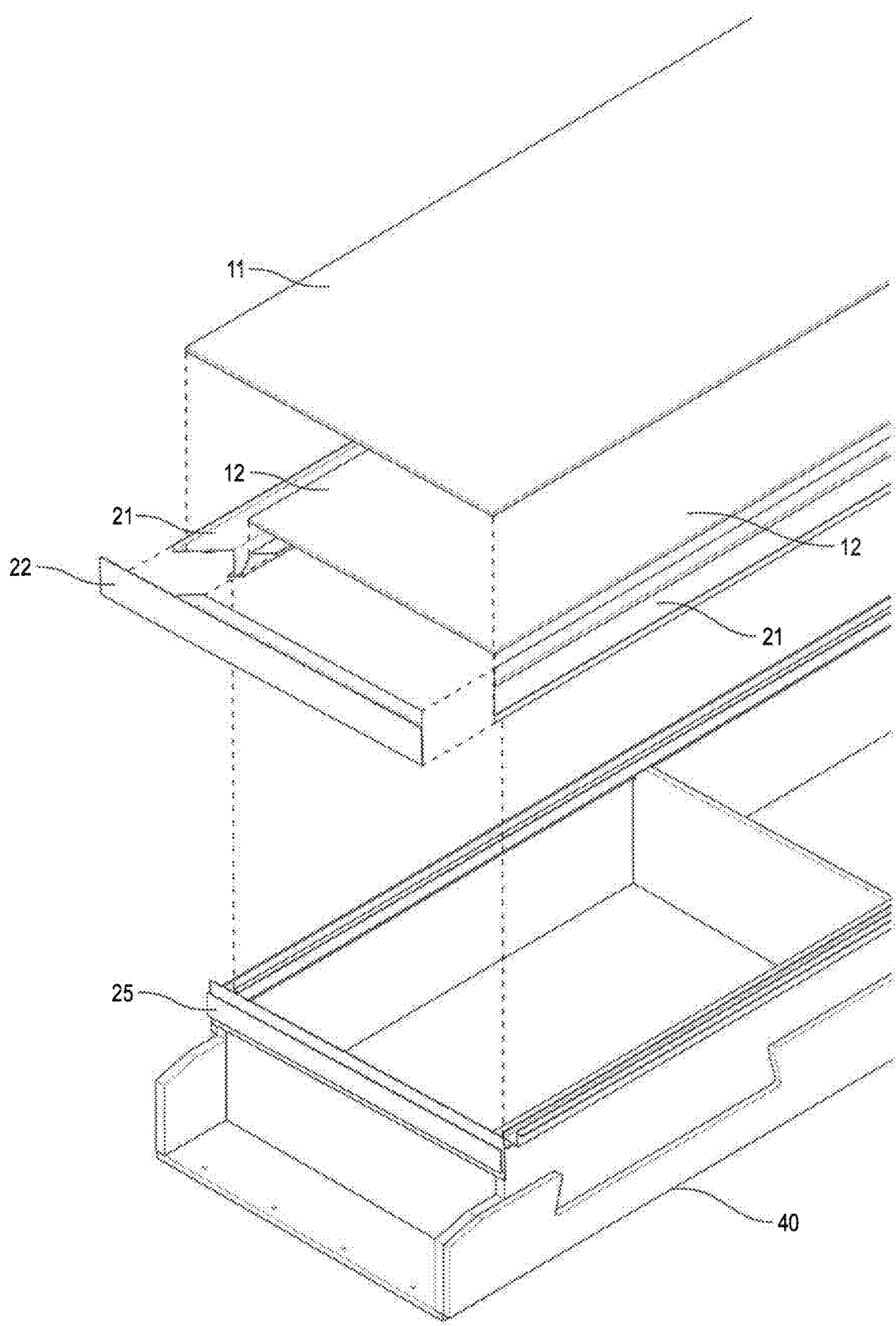
FIG. 3 is an exploded view of the solar photovoltaic panel, the solar thermal panel and extruded framing components according to principles presented herein.

FIG. 3 is an exploded view of the top layer 10 of the composite panel shown in FIG. 1. FIG. 3 shows the solar photovoltaic panel 11 in FIG. 2 comprised of an array of photovoltaic cells laminated to the bottom face of a sheet of transparent glass and protected by a film layer or alternative protective membrane with adequate thermal transmission. The solar thermal collector panel 12 is underneath and in direct contact with the solar photovoltaic panel 11. Having direct panel-to-panel contact enhances the transmission of solar thermal energy from the solar photovoltaic panel 11 to the solar thermal collector panel 12.

In this illustrative example, the solar thermal collector panel is a prefabricated panel of two parallel metal sheets sealed in such a way to form a thin cavity between the parallel sheets. The cavity within the solar thermal collector panel 12 is filled with a fluid heat-absorbing medium that transfers thermal energy collected from the solar photovoltaic panel 11 through hydronic lines 13 (as described in FIG. 10) via hydronic fittings located on the short ends of the underside of the solar thermal collector panel 12. The top panel extruded frame 20 has two perimeter flanges offset in a way so that the solar thermal collector panel 12 and the solar photovoltaic panel 11 may be fastened to the frame in a manner whereby the two panels are held in direct contact (this connection method is further described in FIG. 6).

In this illustrative example, the top panel extruded frame 20 is represented as an aluminum extrusion, however, alternate materials are possible as long as they meet the structural criteria according to an embodiment presented herein.

Figure 6:
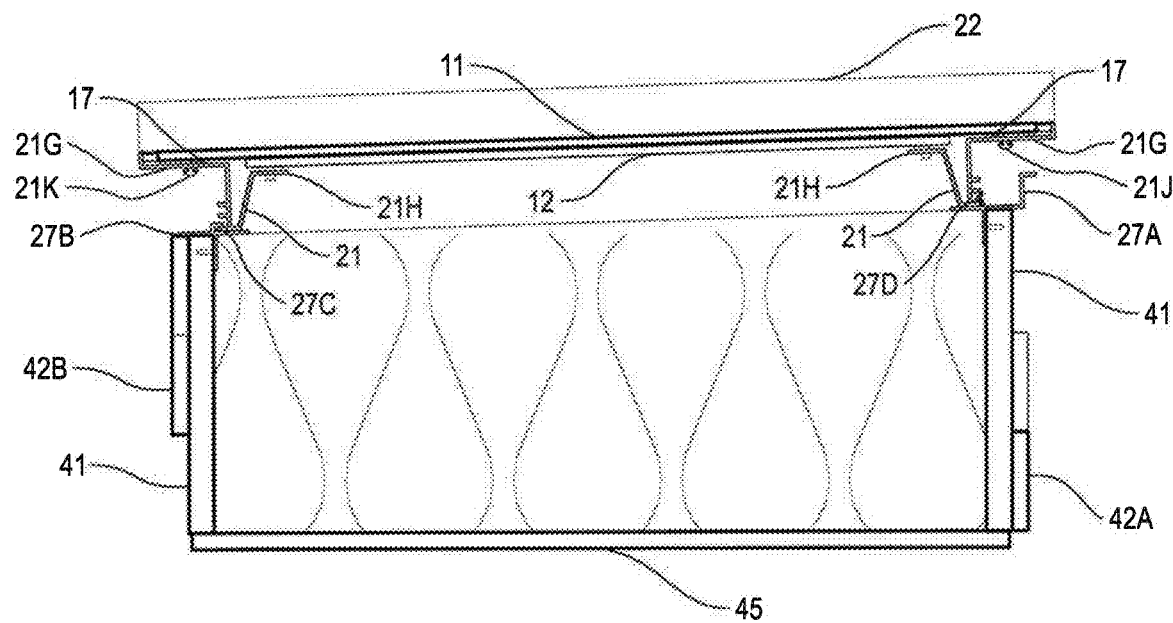
FIG. 6 illustrates a cross sectional view of the composite panel of FIG. 1.
Figure 8:
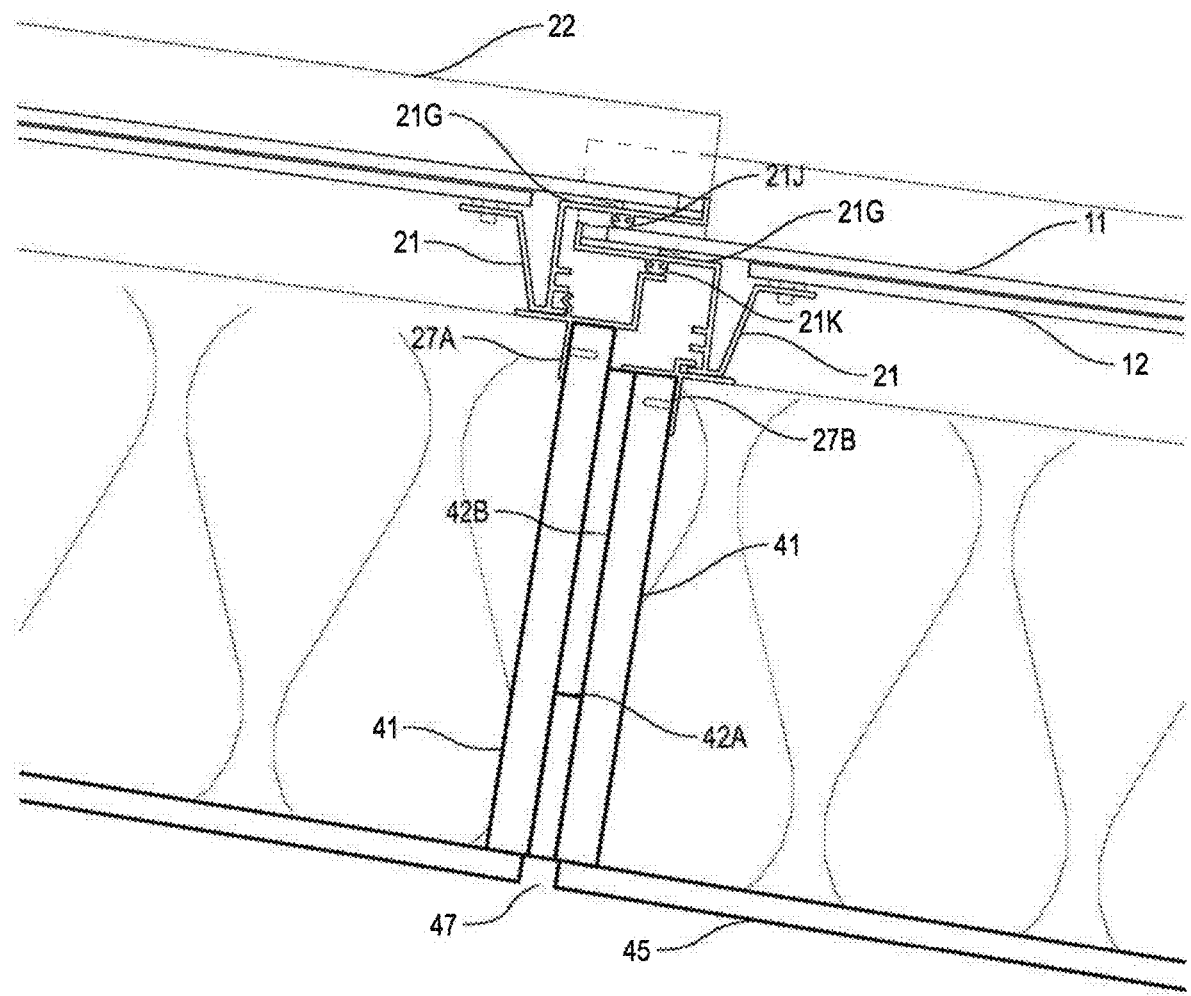
FIG. 8 illustrates a cross-sectional view of adjacent composite panels of FIG. 1 joined together according to principles presented herein.

In this illustrative example, the engineered torsion box 40 is shown in outline for clarity of order. As can be seen in FIG. 6 and FIG. 8, the solar thermal collector panel 12 is less wide than the solar photovoltaic panel 11 so that the panels may be secured to separate oppositely extending flanges of the extruded frame members 21.

Solar photovoltaic panels and solar thermal collector panels are well-documented technologies, so the details of such panels are not further disclosed herein except to the extent the disclosed panels have features unique to the embodiments disclosed herein. Thus, for example, photovoltaic cells are not illustrated, only a representative panel that would include such cells. The solar photovoltaic panel and the solar thermal collector panel may be of separate inventions or of the same composite panel invention with existing or integrated methods of connection.

Figure 4:
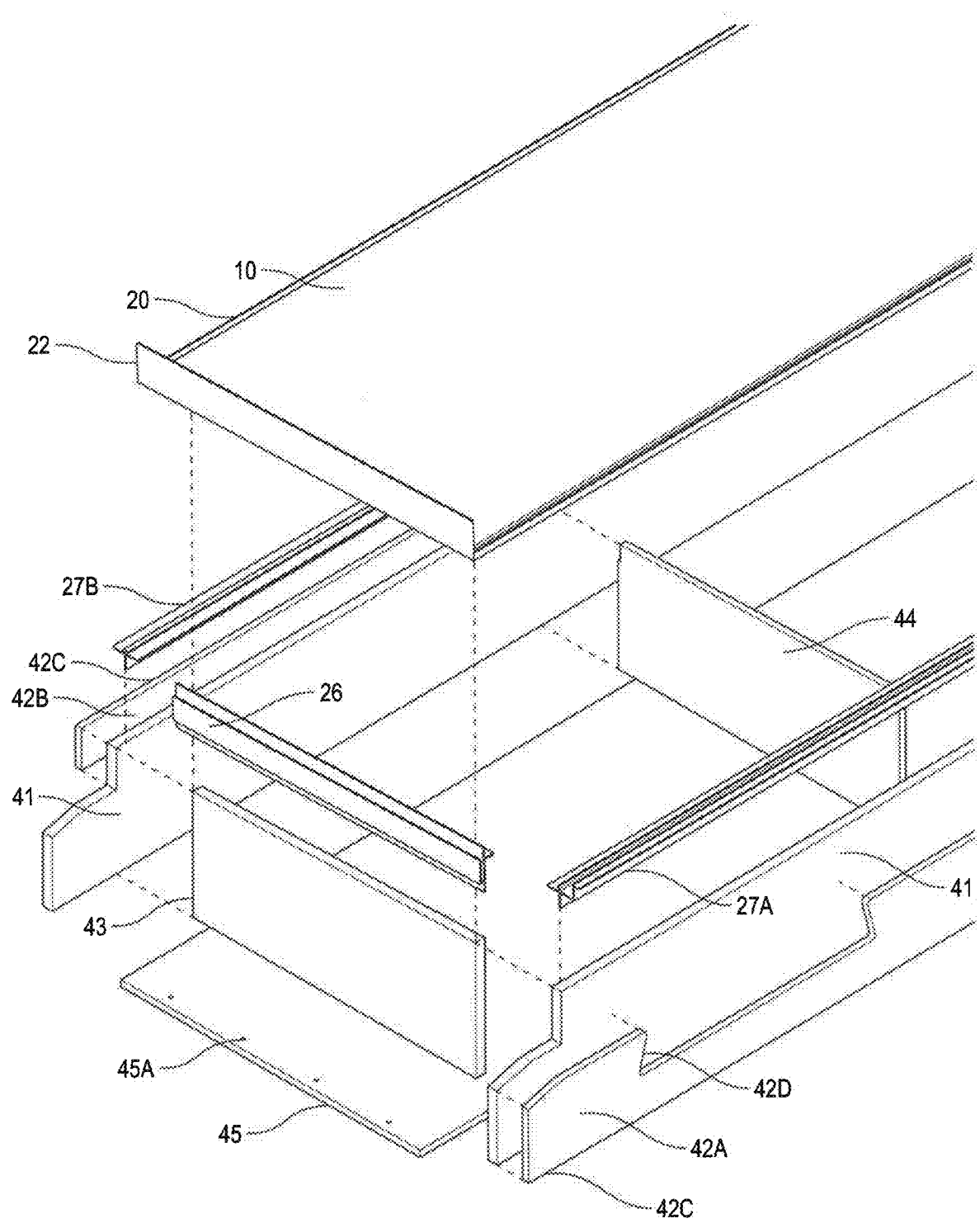
FIG. 4 is an exploded view of an engineered torsion box of FIG. 2.

FIG. 4 is an exploded view of the engineered torsion box 40 as shown in FIG. 2. In this illustrative example, FIG. 4 shows the engineered torsion box 40 comprised of two milled timber sheet beams 41 oriented in parallel along the longer sides of the composite panel, two milled timber sheets 43 located at opposite short ends of the engineered torsion box 40, three milled timber sheet stiffeners 44 evenly spaced between and oriented perpendicular to the timber sheet beams 41, and one timber sheet 45 oriented along the bottom of the engineered torsion box 40 and fully covering the bottom edges of the timber beams 41 and timber sheets 43 and 44 along all sides. The timber sheet 45 thus serves as the bottom of the engineered torsion box 40. The length of the timber sheet 45 is equal to the full length of the timber beams 41 to allow for flanges 45A at opposite ends of the engineered torsion box 40 for fastening the composite panel 8 to a structural system as described below.

All of the timber sheet members 41, 43, 44 and 45 when joined together act as a rigid engineered torsion box that allows the composite panel 8 to span from end-to-end without intermediary support members (as described below in connection with FIG. 7). Attached to the sides of the timber sheet beams 41 on opposite sides of the engineered torsion box 40 are two milled timber sheets 42A and 42B each with a straight edge 42C and a respective milled joinery profile 42D (visible in this figure) or 42E (visible in FIG. 5). The joinery profiles 42D and 42E are milled to mate as described in more detail below in connection with FIG. 7. To that end, the timber sheet 42A is positioned with its straight edge 42C along a bottom edge of the engineered torsion box 40 with the milled profile 42D facing upward relative to the engineered torsion box 40 while the timber sheet 42B is positioned with its straight edge 42C along the top edge of the engineered torsion box 40 with the milled profile 42E facing downward relative to the engineered torsion box 40. The timber sheets 42A and 42B can be attached to the timber sheet beams 41 by any suitable means such as adhesives, mechanical fasteners (including, but not limited to, screws or nails) or a combination of such means.

Alternatively, the timber sheets 42A and 42B could be milled out of thicker timber beams and would thus be unitary with the timber beams 41. This illustrative example shows the timber sheets 42A and 42B milled with dovetail joinery profiles 42D and 42E to form a rigid connection with adjoining composite panels 8 as described in FIG. 7. However, any similar joinery profile of various dimension would suffice as long as a rigid connection between composite panels is formed. Alternate means of forming panel-to-panel rigid connections include, but are not limited to, dowels, mechanical fasteners, or other methods of joinery.

The engineered torsion box 40 provides a plurality of spaces or cavities between the timber sheet stiffeners 44 which can receive the insulation 30, preferably with one unit of insulation 30 per cavity. A torsion box extruded frame 25 (comprised of extruded frame members 26, 27A and 27B described below) lines the top exposed edge of the engineered torsion box 40 and is attached via mechanical fasteners to inside faces of the timber sheet beams 41. To secure the top layer 10 to the engineered torsion box 40, the torsion box extruded frame 25 receives frame member 21 of the top layer extruded frame 20, described further in connection with FIG. 6. In this illustrative example, the top layer 10 of the composite panel 8 is represented as an outline for clarity of order.

Figure 5:
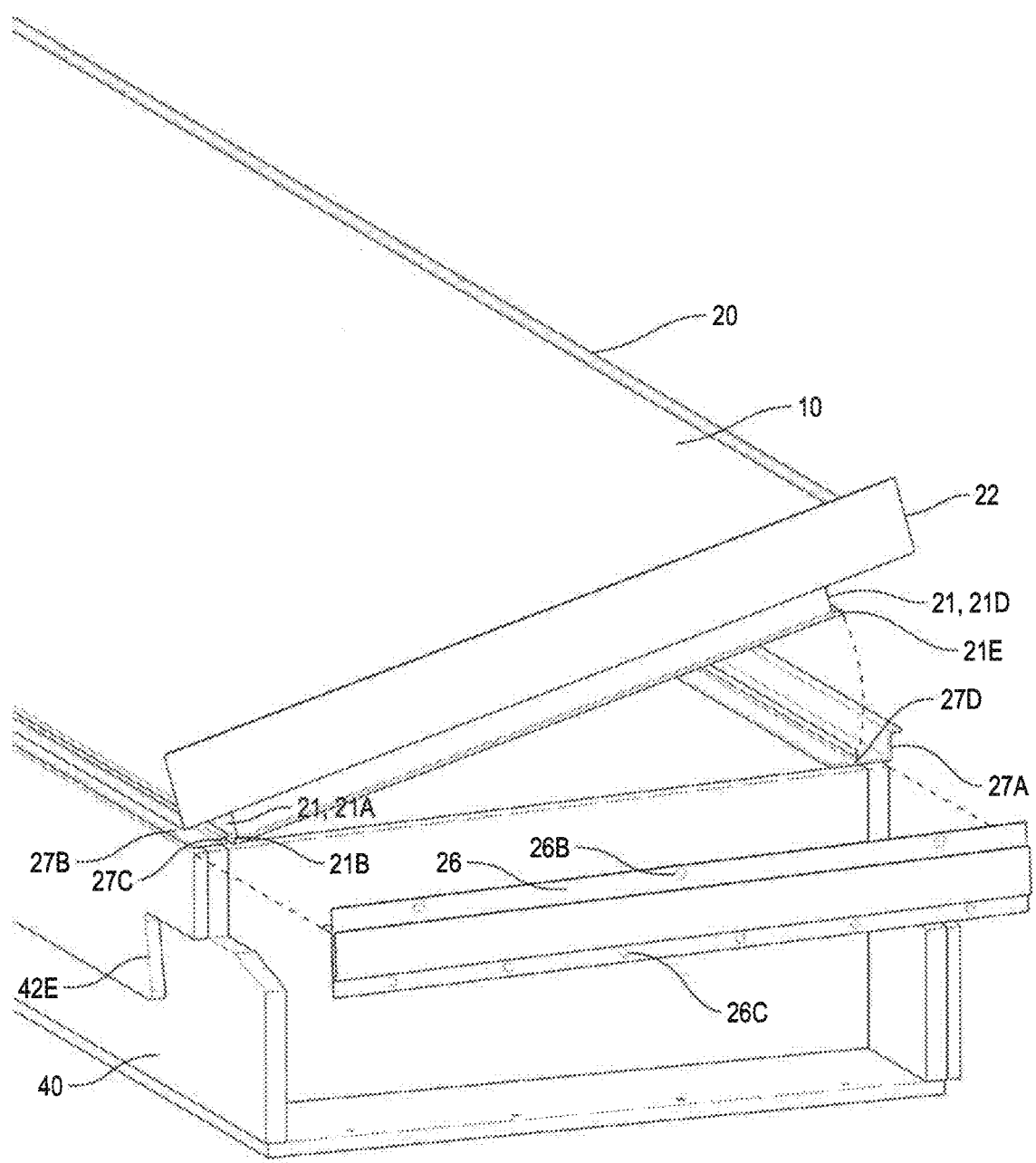
FIG. 5 is an exploded view of the composite panel of FIG. 1 illustrating a removable top layer.

FIG. 5 is an exploded view of the composite panel 8 illustrating the removability of top layer 10 and top layer extruded frame 20 for ease of maintenance and/or replacement. The upslope side 21A of the top panel extruded frame member 21 has a flange 21B that slides into a channel 27C of torsion box extruded frame member 27B. The downslope side 21D of the top panel extruded frame member 21 has a flange 21E that snaps into a profiled flange 27D of torsion box extruded frame member 27A that acts as a spring clip. This method allows for the top layer 10 to be removed after the composite panels 8 are joined into an array as described in FIG. 7. Once snapped into profiled flange 27D, the top layer 10 and top layer extruded frame 20 are further secured by set screws which extend through holes 26B in torsion box extruded frame member 26. Torsion box extruded frame member 26 is also attached to the engineered torsion box 40 via set screws or mechanical fasteners which extend through othe holes 26C in the frame member 26. These extruded frame members are further described in FIG. 6 and FIG. 10.

FIG. 6 illustrates a cross sectional view of a composite panel 8 perpendicular to the span direction. This cross-sectional view shows the relationship of the elements described in FIG. 3 and FIG. 4. The solar photovoltaic panel 11 is glazed on top of spacer bars 17 with silicone to an upper flange 21G of the top panel extruded frame 20. The solar thermal collector panel 12 sits below and in direct surface contact with the solar photovoltaic panel 11 and is attached to a lower flange 21H of the top panel extruded frame 20 via mechanical fasteners. Alternate methods of attachment include, but are not limited to adhesives, splice connections, or integral extruded clips. The top panel extruded frame member 21 is profiled in such a way to support and secure the solar photovoltaic panel 11 and the solar thermal collector panel 12 so that the bottom face of the solar photovoltaic panel 11 and the top face of the solar thermal collector panel 12 are in direct contact to facilitate efficient thermal conduction between panels. To that end, the top panel extruded frame member 21 has one upper flange 21G to which the solar photovoltaic panel 11 is secured and one lower flange 21H to which the solar thermal collector panel 12 is secured which protrude opposite one another and which extend from separate parallel legs of the top panel extruded frame member 21 which differ in height by approximately the depth of the solar thermal collector panel 12.

A cavity formed by the two legs of the top panel extruded frame member 21 collects incidental excess moisture condensing within the composite panel 8 for drainage by gravity to the raceway cavities 51 at either short end of the composite panel 8 (described below). The top panel extruded frame 20 includes integral raceways 21J & 21K for gaskets that act as primary weather and water seals when joined with adjacent composite panels into an array (joining of composite panels is described in FIG. 7).

As described above in FIG. 5, the top panel extruded frame 20 securely clips into the torsion box extruded frame 25 via a channel 21C on the upslope side of the torsion box extruded frame 25 and a spring-clip profiled flange 21F on the downslope side of the torsion box extruded frame 25. The torsion box extruded frame 25 rests on the top edges of the engineered torsion box 40 below and is attached via mechanical fasteners to the inside faces of the timber sheet beams 41 of the engineered torsion box 40. This cross-sectional view shows a timber sheet stiffener 44 in profile sloped along the top edge to meet perpendicularly and flush with the top edges of timber sheet beams 41 of differing depths. This slope allows for the top layer 10 of one upslope composite panel 8 to pass over and sit on top of the top layer 10 of an adjacent downslope composite panel 8 to create a covered overlapping joint between connecting composite panels as described in FIG. 7.

Figure 7:
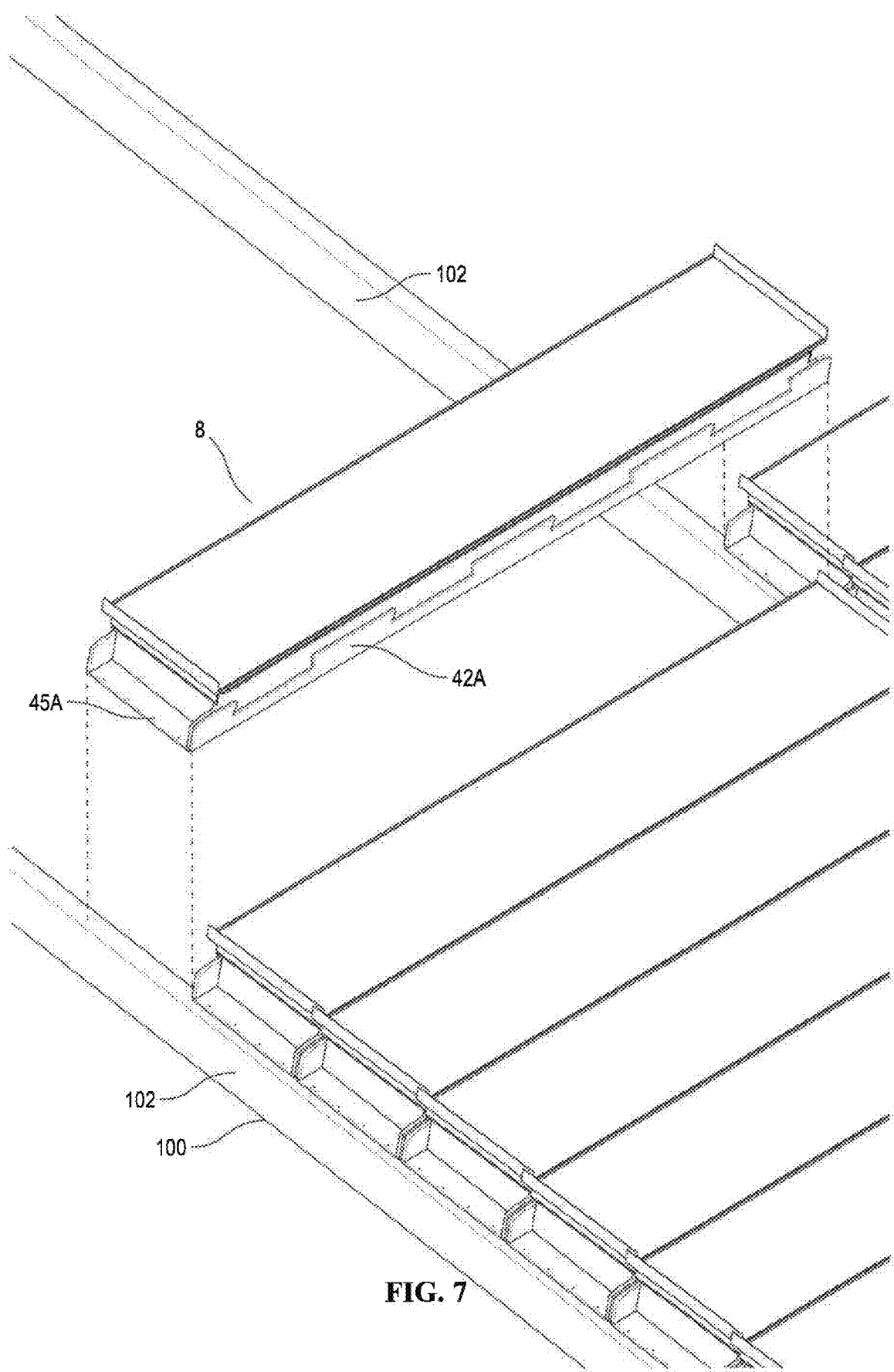
FIG. 7 illustrates an assembly of plural composite panels of FIG. 1 on a structural frame to form an array according to principles presented herein.

FIG. 7 illustrates an assembly of plural composite panels 8 installed on a structural frame 100 with beams, rafters, or other suitable supports 102 to form one or more arrays of composite panels 8 according to principles presented herein. The composite panels 8 span from end-to-end on the structural frame 100 and extend between two beams, rafters, or other suitable supports 102. As can be seen, the beams, rafters, or other suitable supports 102 are arrayed along a first direction while the composite panels 8 are arrayed along a second direction orthogonal to the first direction. Additionally two arrays of composite panels 8 are shown. The first array is supported on a first and a second beams, rafters, or other suitable supports 102. The second array is support on the second beam, rafter, or other suitable support 102 and a third beam, rafter, or other suitable support 102 (not illustrated).

Within the structural frame 100 the beams, rafters, or other suitable supports 102 are sufficiently sloped, raked, or inclined to allow for gravity flow of water off of the installed array of composite panels 8. Preferably, a composite panel spans over an expanse between two structural beams, rafters, or other suitable supports 102, however, depending on the structure, it could also extend over one or more load bearing or non-load bearing interior partitions. As also illustrated, two composite panels adjacent in the span direction can share a single beam, rafter or other suitable support 102 by securing the respective flanges 45A of each panel to one half of the edge of a beam, rafter, or other suitable support 102. In this way multiple arrays can be secured to the beams or other suitable supports 102 and form a structural roof.

In this illustrative description the structural frame 100 is represented as heavy timber, but could alternatively be, but not limited to, steel, engineered timber, light timber, walls, or any material of suitable strength and durability. Each composite panel 8 is installed by setting the ends 45A of the panel on the beams, rafters, or other suitable supports 102, aligning one of the joinery profiles 42A or 42B with an opposing profile 42B or 42A of an adjacent previously installed panel, sliding the panel being installed towards the previously installed panel so the joinery profiles mate and nest into each other, and securing the position of the panel with mechanical fasteners through the bottom timber sheet flanges 45A into the top edges of the beams, rafters, or other suitable supports 102 of the structural frame 100.

When installed in this way, the top layer 10 of an upslope composite panel 8 overlaps the top layer 10 of an adjacent downslope composite panel 8 in a repetitive fashion so that each downslope composite panel 8 in an array of composite panels is partially covered by the top layer 10 of the immediately adjacent upslope composite panel 8. This method of overlap between adjacent composite panels 8 in combination with a sufficient slope or incline of the beams, rafters, or rafters 102 onto which the composite panels 8 are installed, is meant to facilitate the gravity flow of water off of the array of composite panels 8.

FIG. 8 illustrates a cross sectional view perpendicular to the span direction of two adjacent composite panels in an array as illustrated in FIG. 7. This cross section shows the various interlocking relationships between the extruded frames 20 & 25, and the milled timber sheets with joinery profiles 42A and 42B. The top layer 10 of the upslope composite panel 8 overlaps the top layer 10 of the adjacent downslope composite panel 8 to allow for the flow of water over the top layers 10 of adjacent composite panels 8, inhibit water infiltration between adjacent composite panels 8, and facilitate water drainage at the downslope side of an array of composite panels as described above in FIG. 7. A first gasket 21J extending along the underside of an outwardly projecting flange 21G of the top panel extruded frame member 21 of an upslope composite panel 8 compresses against and provides a seal with the top panel 10 of an adjacent downslope composite panel 8. A second gasket 21K extending along the underside of an outwardly projecting flange 21G of the top panel extruded frame member 21 of a downslope composite panel 8 compresses against and provides a seal with the torsion box extruded frame member 27A of an upslope composite panel 8. These gaskets 21J & 21K provide the primary water seals between adjoining composite panels 8. Adjacent engineered torsion boxes 40 are adjoined and rigidly connected by the joinery profiles 42A and 42B to act compositely in a structural manner. This illustrative description shows a slight gap or reveal 47 between bottom timber sheets 45 of adjacent composite panels 8 to serve as a visual control joint so potential misalignment between composite panels 8 is less perceptible than if the edges of bottom timber sheets 45 were to meet in a flush condition. Where the timber surface of 45 is not desired as an interior finish, other finish materials, such as painted gypsum wall board, may be provided directly over the bottom timber sheet 45.

Figure 9:
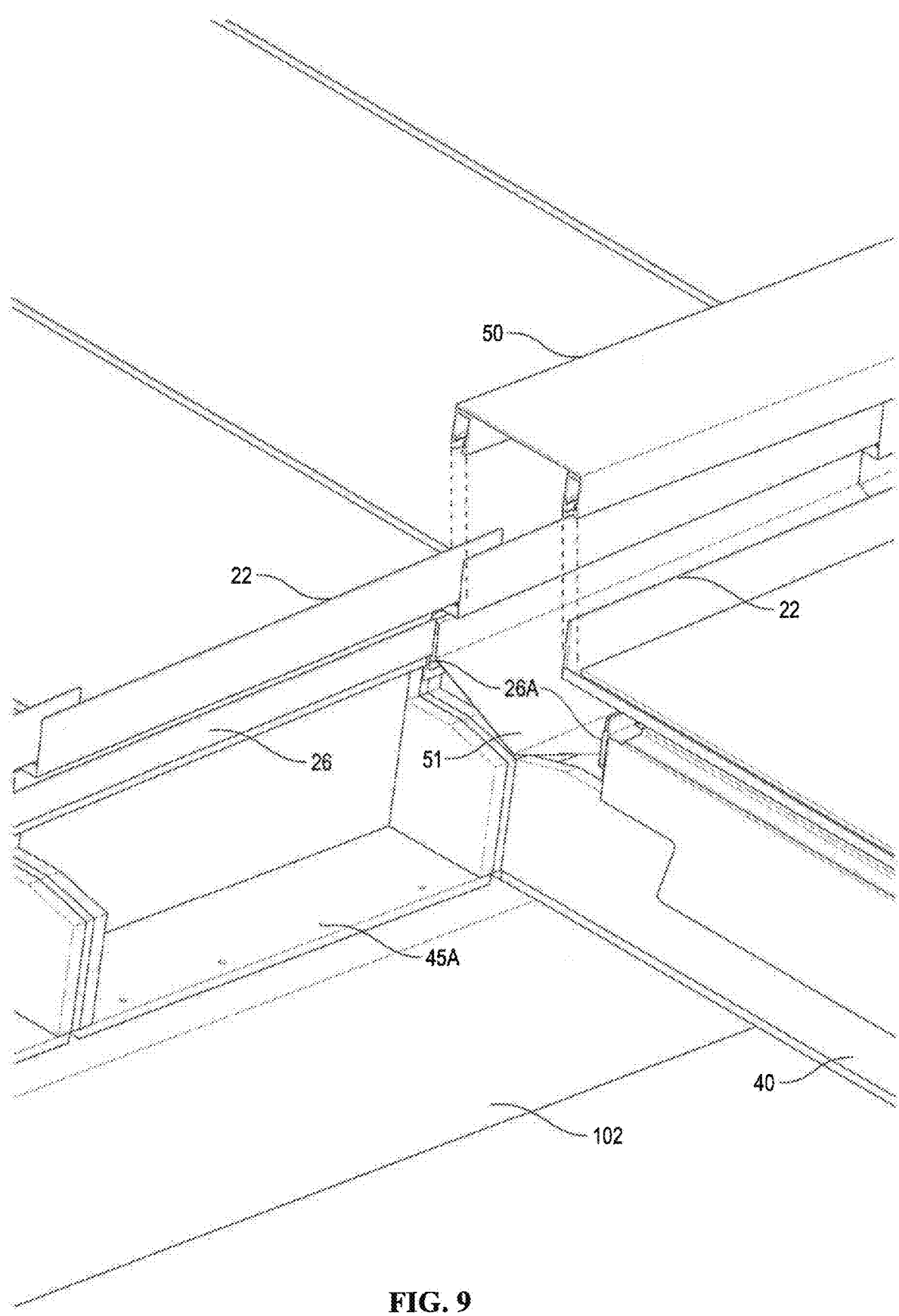
FIG. 9 is an exploded view of an intersection of adjacent arrays of composite panels of FIG. 1 according to principles presented herein.
Figure 10:
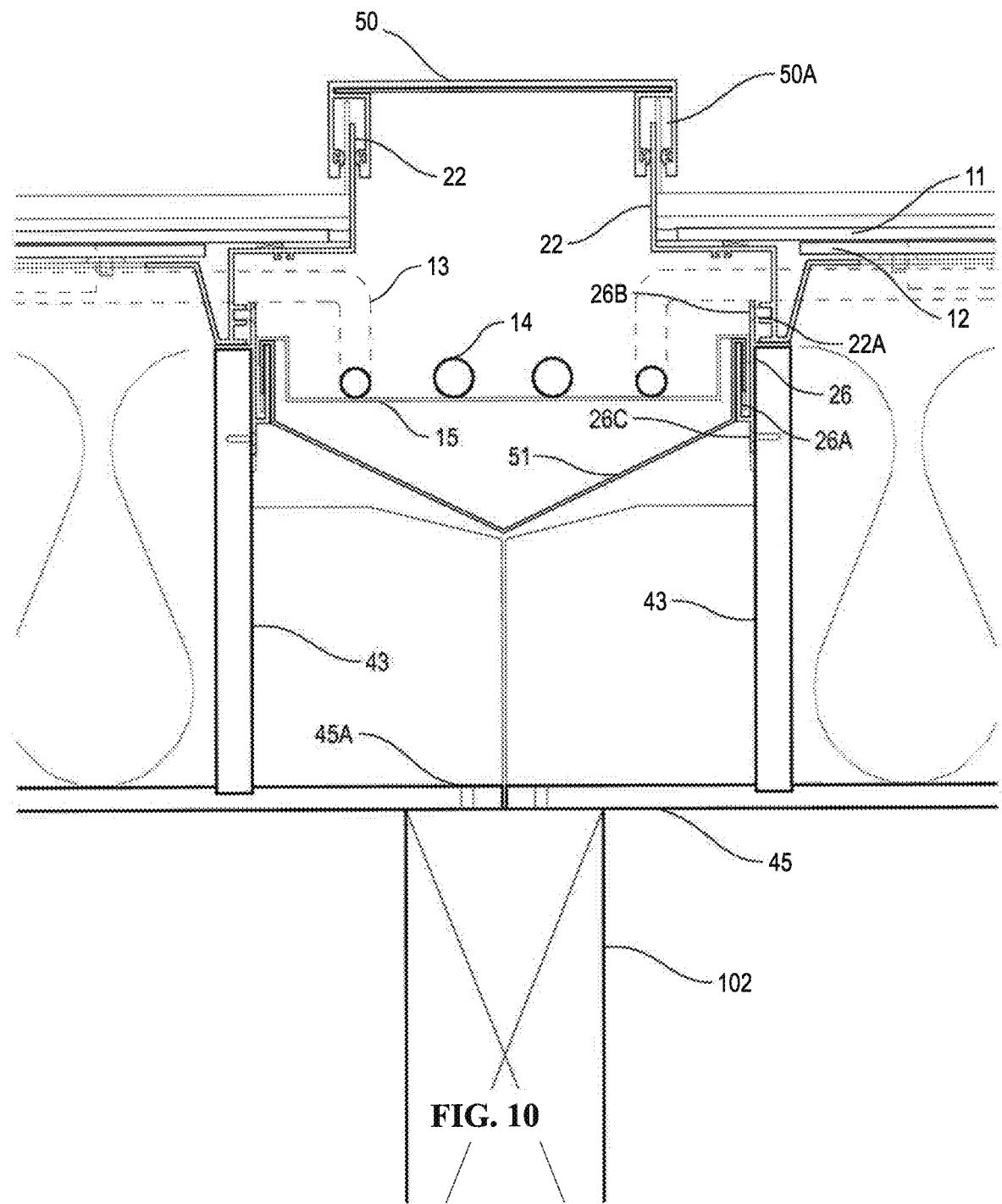
FIG. 10 illustrates a cross sectional view of a joined condition of composite panels in different arrays according to principles presented herein.

FIG. 9 is an enlarged exploded view of the intersection of multiple composite panels 8 of adjacent arrays at a beam, rafter, or other suitable support 102, while FIG. 10 illustrates a cross sectional view of the installed condition of the composite panels 8 attached at a beam, rafter, or other suitable support 102 as shown in FIG. 9. Shown is a covered raceway 51 where hydronic 13 and electrical 14 conduits run as shown in FIG. 10. This illustrative description shows the raceway 51 and cover plate 50 as extruded aluminum profiles that interlock with the top panel extruded frame members 22. FIG. 9 shows top panel extruded frame members 22 at the short ends of the composite panels 8 with upturned legs that angle upwards and which nest and overlap along an array of composite panels 8. As shown in FIG. 10, the top panel extruded frame members 22 receive the extruded cover plate 50 which has parallel channels 50A into which the upturned legs of the top panel extruded frame members 22 of the composite panels of the adjacent arrays are received. The extruded cover plate channels 50A include integral receptors for gaskets that compress and seal to the upturned legs of the top panel extruded frame members 22. The extruded cover plate channels 50A and gaskets are sufficiently flexible and compressible to receive the overlapping condition between the upturned legs of the top panel extruded frame members 22. The extruded raceway 51 is located in the cavity between ends of the composite panels 8 of adjacent arrays, above the beam, rafter, or rafter 102, and is secured by interlocking to upturned flanges 26A of the torsion box extruded frame members 26 of the torsion box extruded frames 25 at opposing ends of composite panels 8. The profile of the extruded raceway 51 slopes toward a low point in its center to collect infiltrating moisture and run it downslope to weep to the exterior. Hydronic conduits 13 and electrical conduits 14 run from the interior of the composite panel 8 to the cavity between adjacent composite panel arrays via connections integrated within the top panel extruded frame members 22. The hydronic conduits 13 and electrical conduits 14 which are run in the cavity between adjacent composite panel arrays rest on a plurality of angled supporting pieces 15 evenly spaced as required and secured above the extruded raceway 51 by interlocking to upturned flanges 26A of the torsion box extruded frame members 26 of the torsion box extruded frames 25 at opposing ends of composite panels 8. The top panel extruded frame 20 is further secured to the torsion box extruded frame 25 by a series of set screws or mechanical fasteners which extend through holes 26B located in the torsion box extruded frame member 26 of the torsion box extruded frame 25 and fasten into threaded grooves 22A located along the vertical leg of the top panel extruded frame member 22.

Figure 11:
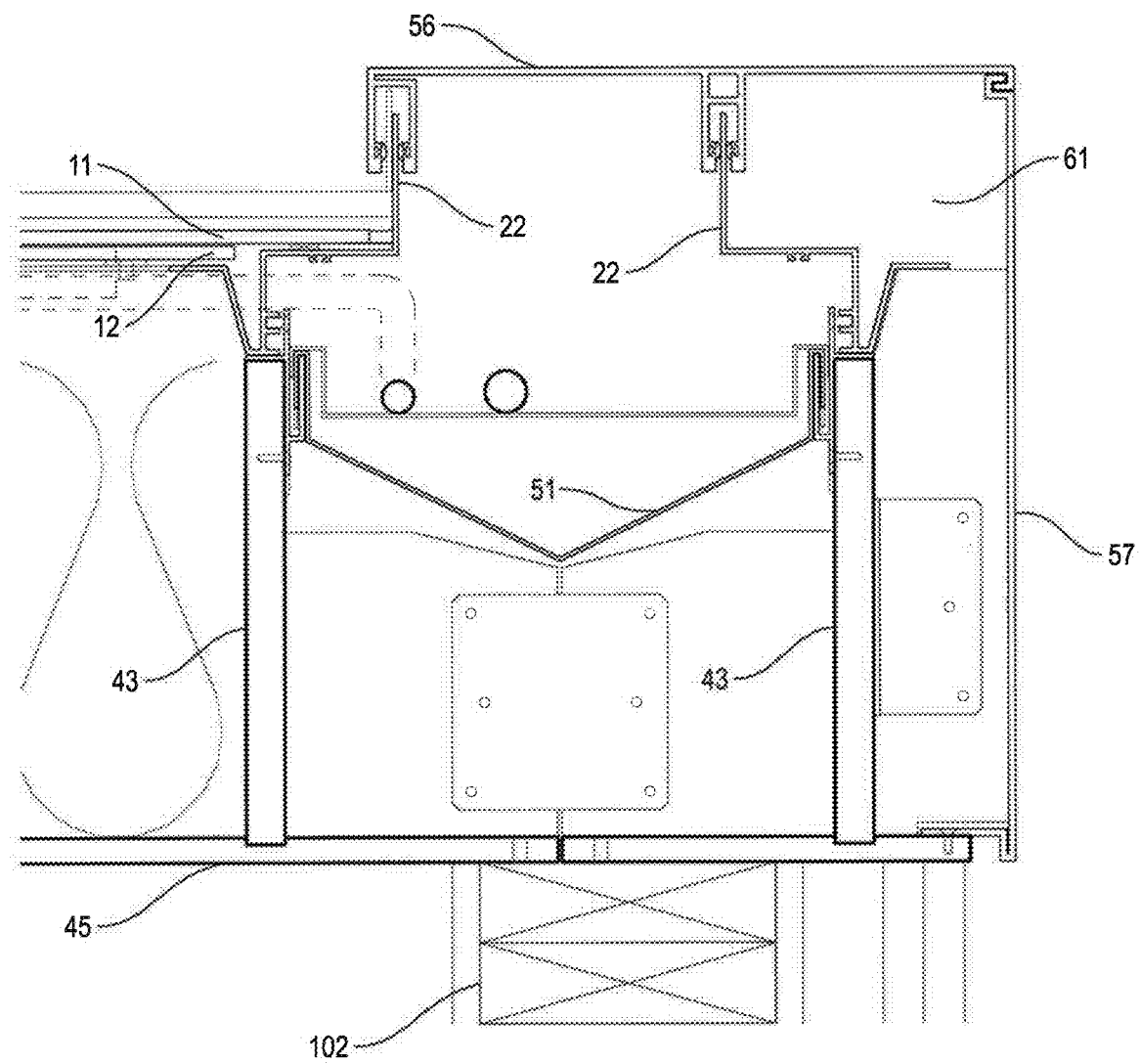
FIG. 11 illustrates another cross sectional view of a cross slope end condition of a composite panel joined to a perimeter panel according to principles presented herein.

FIG. 11 illustrates a cross sectional view of the side extents of an array of composite panels 8 at a cross slope end condition. The short ends of the composite panels 8 meet a side perimeter panel 61 which is secured perpendicular to the spanning direction of the composite panels 8 and parallel to the sloping direction of the supporting beam or rafter or other suitable supporting structural member 102. Similar to the cavity formed by adjacent arrays of composite panels 8, where an array of composite panels 8 meet a side perimeter panel 61 a cavity is formed for hydronic and electrical conduits. This cavity is similarly weather-sealed under a cover plate 56 and contains an extruded raceway 51 supported in the same manner as those between adjacent arrays of composite panels 8. The exposed face 57 of the side perimeter panel 61 may be extruded aluminum, brake metal, or another suitable substitute.

Figure 12:
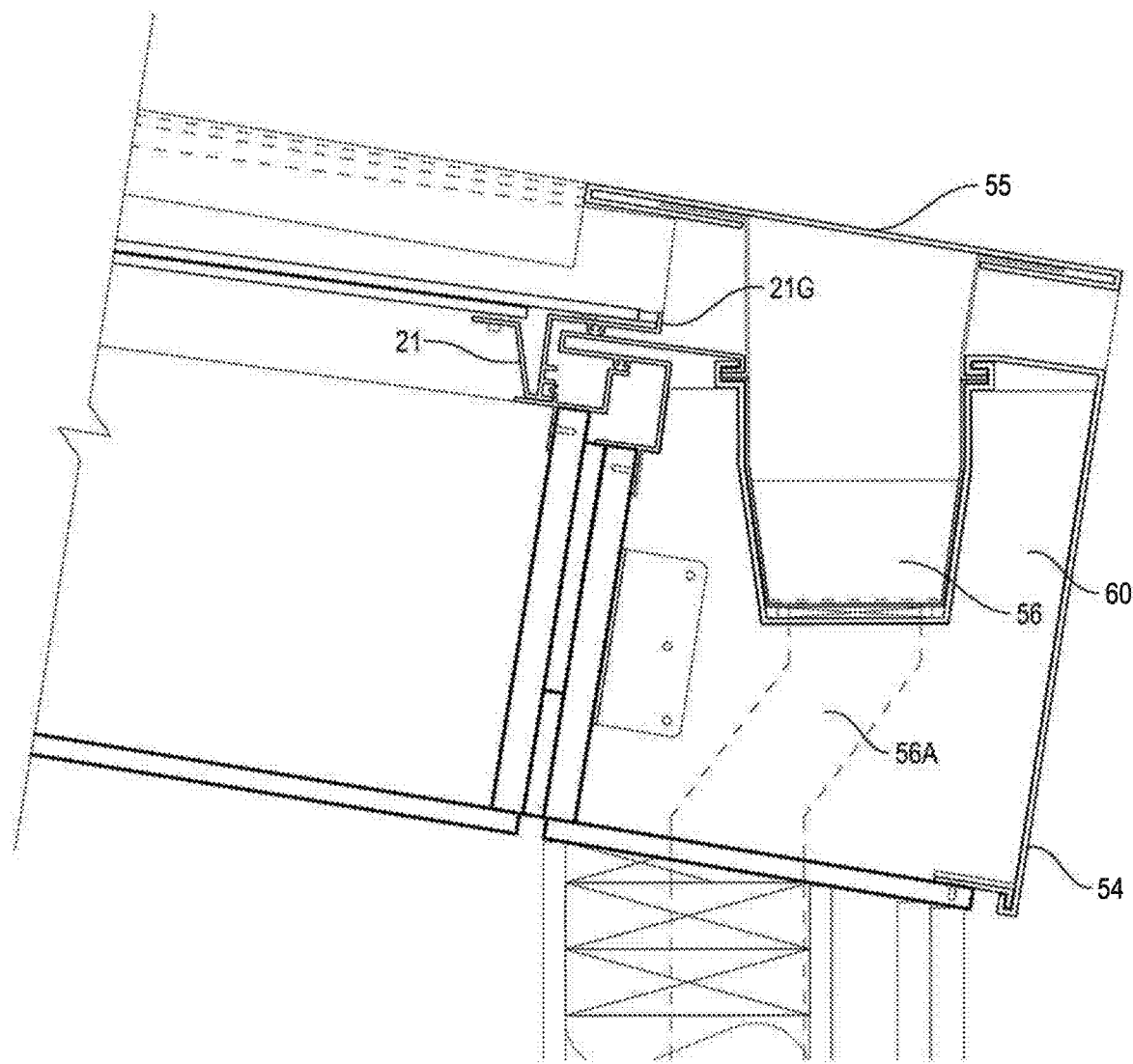
FIG. 12 illustrates a cross sectional view of a downslope end condition of a composite panel joined to a downslope perimeter panel according to principles presented herein.

FIG. 12 illustrates a cross sectional view of the downslope extents of an array of multiple composite panels at a downslope end condition. The long side of the downslope-most composite panel connects to a downslope perimeter panel 60 via a joinery profile in the same manner as adjoining composite panels 8 as described above. The downslope perimeter panel 60 contains an integral internal gutter 56 to convey rainwater flowing off the long-side edge of the downslope-most composite panel 8 to a downspout 56A. The downslope perimeter panel 60 is covered by a gutter cap panel 55 that is open on its sides to allow for the downslope-facing upper flange 21G of top panel extruded frame member 21 of the downslope-most composite panel 8 to overlap with the internal gutter 56 to allow for water flow. The exposed face 54 of the downslope perimeter panel 60 may be extruded aluminum, brake metal, or another suitable substitute.

Figure 13:
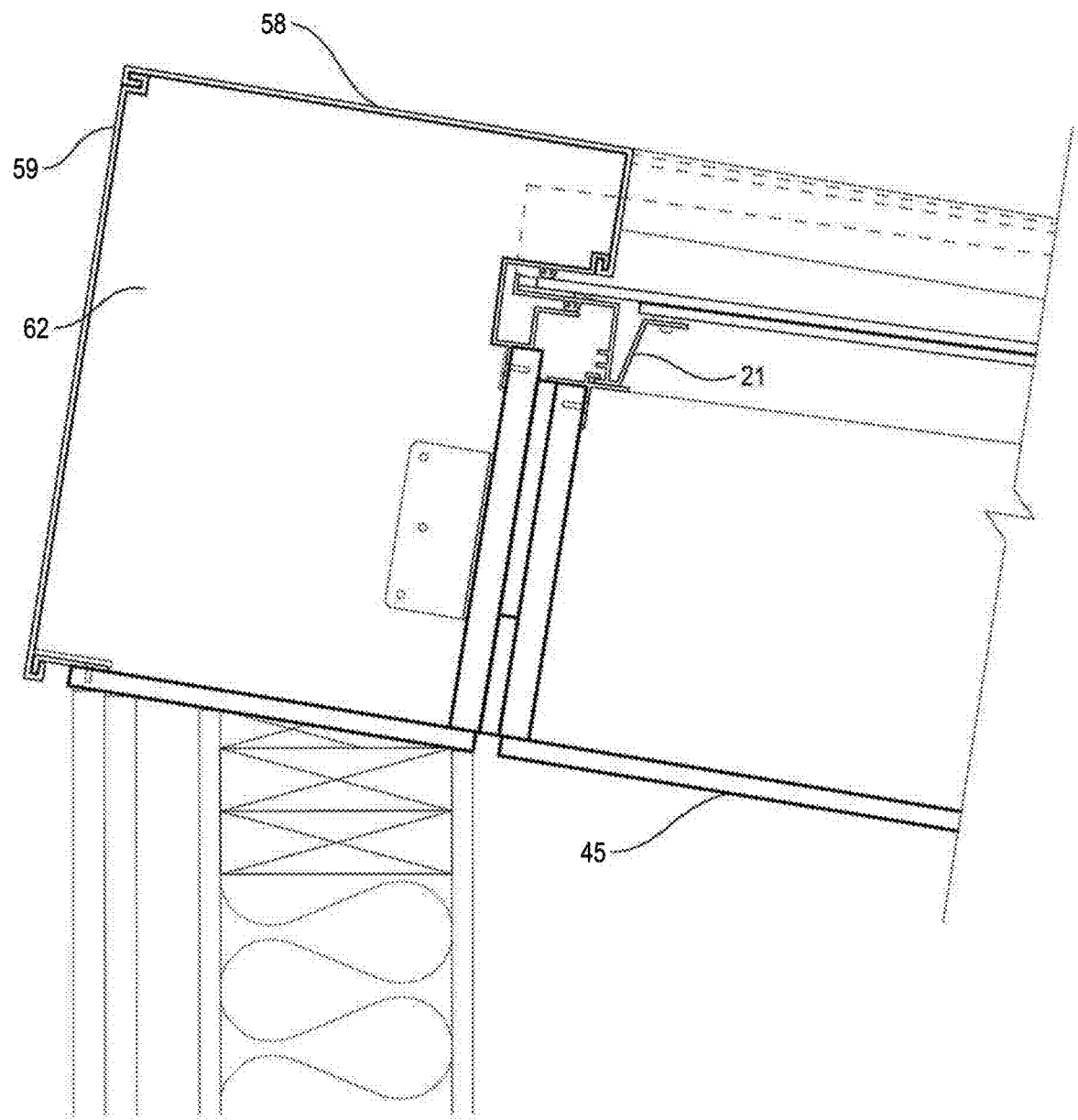
FIG. 13 illustrates a cross sectional view of an upslope end condition of a composite panel joined to an upslope perimeter panel according to principles presented herein.

FIG. 13 illustrates a cross sectional view of the upslope extents of an array of multiple composite panels 8 at an upslope end condition. The long side of the upslope-most composite panel 8 adjoins to an upslope perimeter panel 62 via a joinery profile in the same manner as adjoining composite panels 8 as described above. The top 58 and exposed face 59 of the upslope perimeter panel 62 may be extruded aluminum, brake metal, or another suitable substitute.

Figure 14:
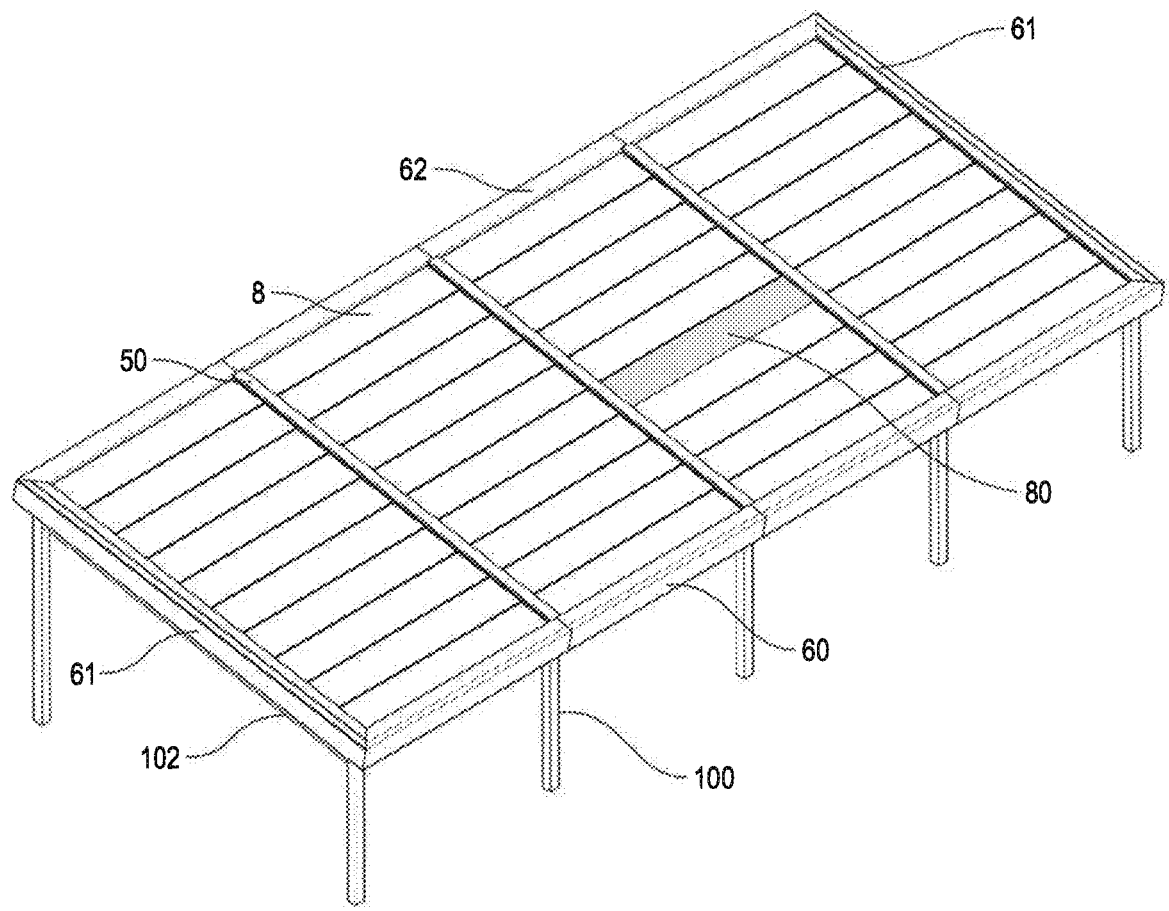
FIG. 14 is an isometric view of a roof system employing composite panels of FIG. 1 in accordance with principles disclosed herein.

FIG. 14 is an isometric view of a modular roof system with four arrays of composite panels 8 with the composite panels arrayed in the second direction orthogonal to the their short axes. Five beams, rafters, or other suitable supports 102 (which the cannot be seen) on which the composite panels are supported are arrayed in the first direction, as described in connection with FIG. 7.

FIG. 14 shows the preferred orientation of the composite panels so that the long axis is perpendicular to the slope of the roof. Depicted in the array of composite panels 8 is a variation of a composite panel 80 which allows for roof penetrations, serving as a vertical riser for conduit, vents, and other connections to building systems as required. This figure shows the preferred orientation of the raceways 50 so that the electrical and plumbing lines run parallel to the slope of the roof. The arrays of composite panels 8 are terminated by perimeter panels 60, 61 and 62 that are approximately one half the width of a composite panel 8. These perimeter panels are described above in connection with FIG. 11, FIG. 12, and FIG. 13. This figure shows an example of the modular roof system spanning across a load bearing frame structure 100 having multiple beams, rafters, or other suitable supports 102. Other load bearing structures may include, but are not limited to, timber frames, steel frames, masonry walls, concrete walls, and timber framed walls.

The foregoing description of an implementation of the disclosure has been presented for the purpose of illustration and description. It is not exhaustive and does not limit the disclosure to the precise form disclosed. Modifications and variations are possible in light of the above teachings or may be acquired from practicing the disclosure. Accordingly, while various embodiments of the present disclosure may have been described, it will be apparent to those of skill in the art that many more embodiments and implementations are possible that are within the scope of this disclosure. Accordingly, the present disclosure is not to be restricted except in light of the attached claims and their equivalents.

What is claimed is:

1. A composite panel comprising:
   a top layer comprising a solar photovoltaic panel located above and in contact with a solar thermal collector panel, the solar photovoltaic panel and the solar thermal collector panel secured together by a top panel perimeter frame; and
   a bottom layer comprising an engineered torsion box containing a layer of insulation and having a torsion box perimeter frame secured thereabove,
   wherein, the top layer and the bottom layer are aligned parallel to each other and secured to each other by means of the top panel and torsion box perimeter frames and sealed by integral gaskets.

2. The composite panel of claim 1, wherein the solar thermal collector panel is between the solar photovoltaic panel and the engineered torsion box.

3. The composite panel of claim 1, comprising a top surface with a non-combustible exterior finish.

4. The composite panel of claim 1, wherein the solar thermal collector panel is aligned parallel and underneath the solar photovoltaic panel with a surface of the solar thermal collector panel in contact with a surface of the solar photovoltaic panel.

5. The composite panel of claim 1, wherein the engineered torsion box supports the solar thermal collector panel and the solar photovoltaic panel.

6. The composite panel of claim 1, wherein the top panel perimeter frame is an extruded frame, the torsion box perimeter frame is an extruded frame, or both the top panel perimeter frame and the torsion box perimeter frame are extruded frames.

7. The composite panel of claim 1, wherein a bottom surface of the engineered torsion box functions as interior finish and a structural diaphragm.

8. The composite panel of claim 1, wherein top edges of the engineered torsion box are profiled to support the top layer, the solar photovoltaic panel and the solar thermal collector panel when the composite panel is in a sloping position relative to horizontal.

9. The composite panel of claim 1, wherein a cavity of the engineered torsion box is filled by one or more of the layer of insulation.

10. The composite panel of claim 1, wherein the layer of insulation does not impart structural rigidity.

11. The composite panel of claim 1, wherein the solar thermal collector panel is rigid.

12. The composite panel of claim 1, wherein opposite sides of the engineered torsion box include joinery profiles which mate with a joinery profile of an adjacent composite panel.

13. The composite panel of claim 1, wherein the integral gaskets are configured for weather sealing the engineered torsion box.

14. The composite panel of claim 1, wherein the integral gaskets are configured for weather sealing between adjacent composite panels.

15. A structure comprising:
a load bearing structure with at least two support members; and
a plurality of composite panels arrayed along the at least two support members, each composite panel according to claim 1 and each said composite panel supported on the at least two support members.

16. The structure of claim 15, wherein the load bearing structure includes a frame or parallel walls constructed of timber, engineered timber, steel, masonry, concrete, or combinations thereof.

17. The structure of claim 15, wherein at least one of the composite panels spans between the at least two support members without an intermediate support member.

18. The structure of claim 15, wherein the composite panels do not rely on shear wall support.

19. The structure of claim 15, wherein each composite panel includes integral weather seals within an extruded frame to provide a seal with an adjacent composite panel of the plurality of composite panels.

20. The structure of claim 15, wherein opposing sides of two adjacent composite panels of the plurality of composite panels includes a mating joinery profile to provide structural stiffness to the load bearing structure when the joinery profiles are mated.

21. The structure of claim 20, wherein the mating joinery profiles are made of timber.

22. A roof system comprising:
a load bearing structure including first and second support members arrayed along a first direction of a roof;
a plurality of composite panels arrayed along the first and second support members and along a second direction orthogonal to the first direction, each composite panel according to claim 1 and each said composite panel supported on the first and second support members; and
hydronic conduits and electrical conduits integrated into the array of composite panels.

23. The roof system of claim 22, wherein:
the plurality of composite panels is a first plurality of composite panels;
the load bearing structure comprises a third support member, the first, second, and third support members being arrayed along the first direction;
a second plurality of composite panels arrayed in the second direction;
the second plurality of composite panels is supported on the second and third support members and providing a raceway between the first and second pluralities of composite panels;
and hydronic conduits and electrical conduits extend within the raceway.

24. The roof system of claim 22, comprising a riser panel attached to one of the composite panels, wherein the hydronic conduits and electrical conduits access building hydronic services and electrical services via the riser panel.

25. The roof system of claim 22, comprising a riser panel attached to one of the composite panels, wherein the riser panel has mechanical equipment and plumbing vents.

26. The roof system of claim 22, wherein the roof is sloped and a downslope end of the array of composite panels includes a respective downslope composite panel which includes an integral gutter.

27. The roof system of claim 22, wherein the roof is sloped and an upslope end of the array of composite panels includes a respective upslope composite panel with integral weather sealing gaskets.

* * * * *